Figure 1:
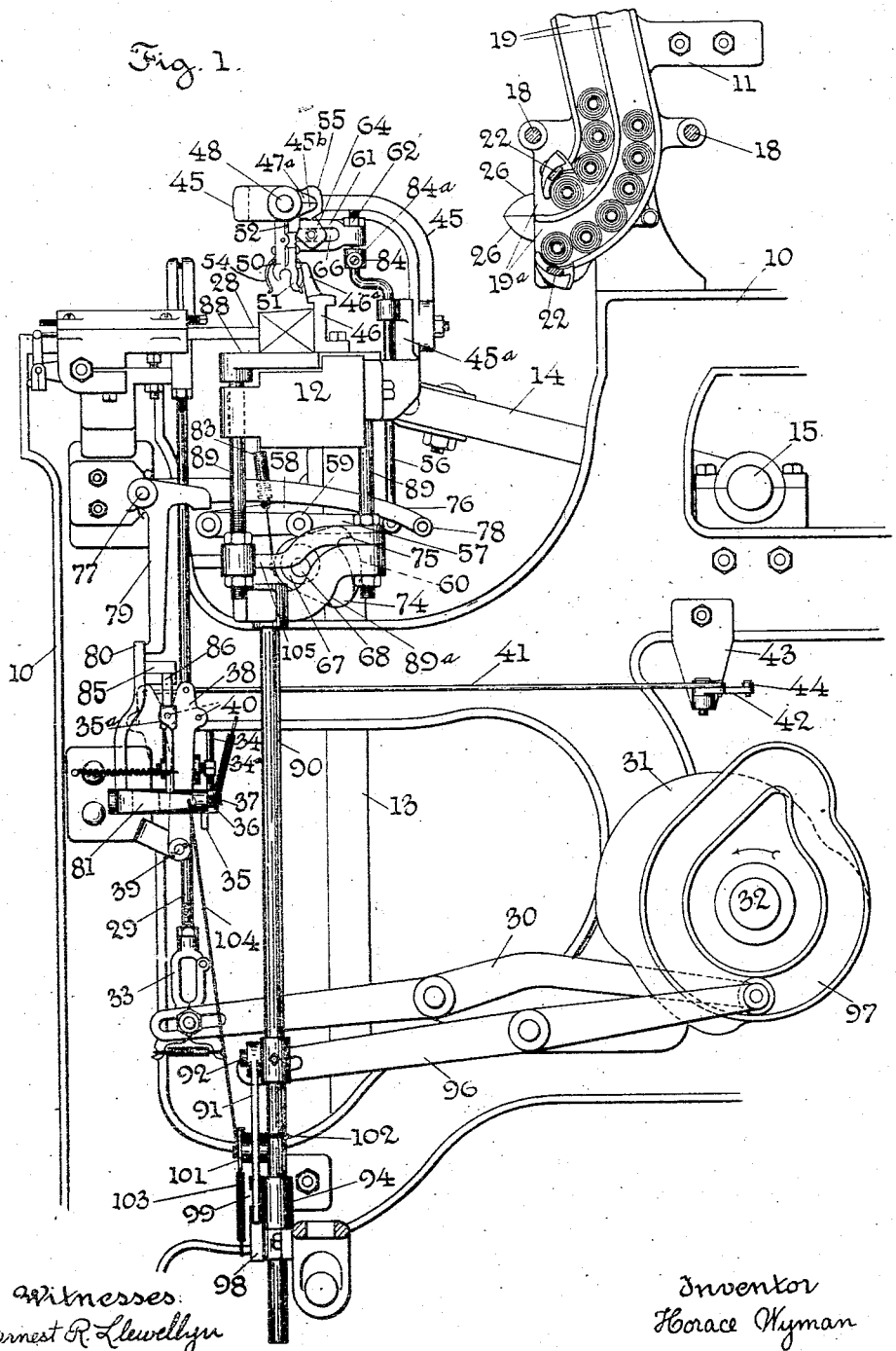

H. WYMAN.
WEFT REPLENISHING LOOM.
APPLICATION FILED FEB. 5, 1914.

1,142,743.

Patented June 8, 1915.
6 SHEETS—SHEET 1.

Witnesses
Ernest R. Llewellyn
C. I. Hartnett

Inventor
Horace Wyman
By Southgate & Southgate
Attorneys

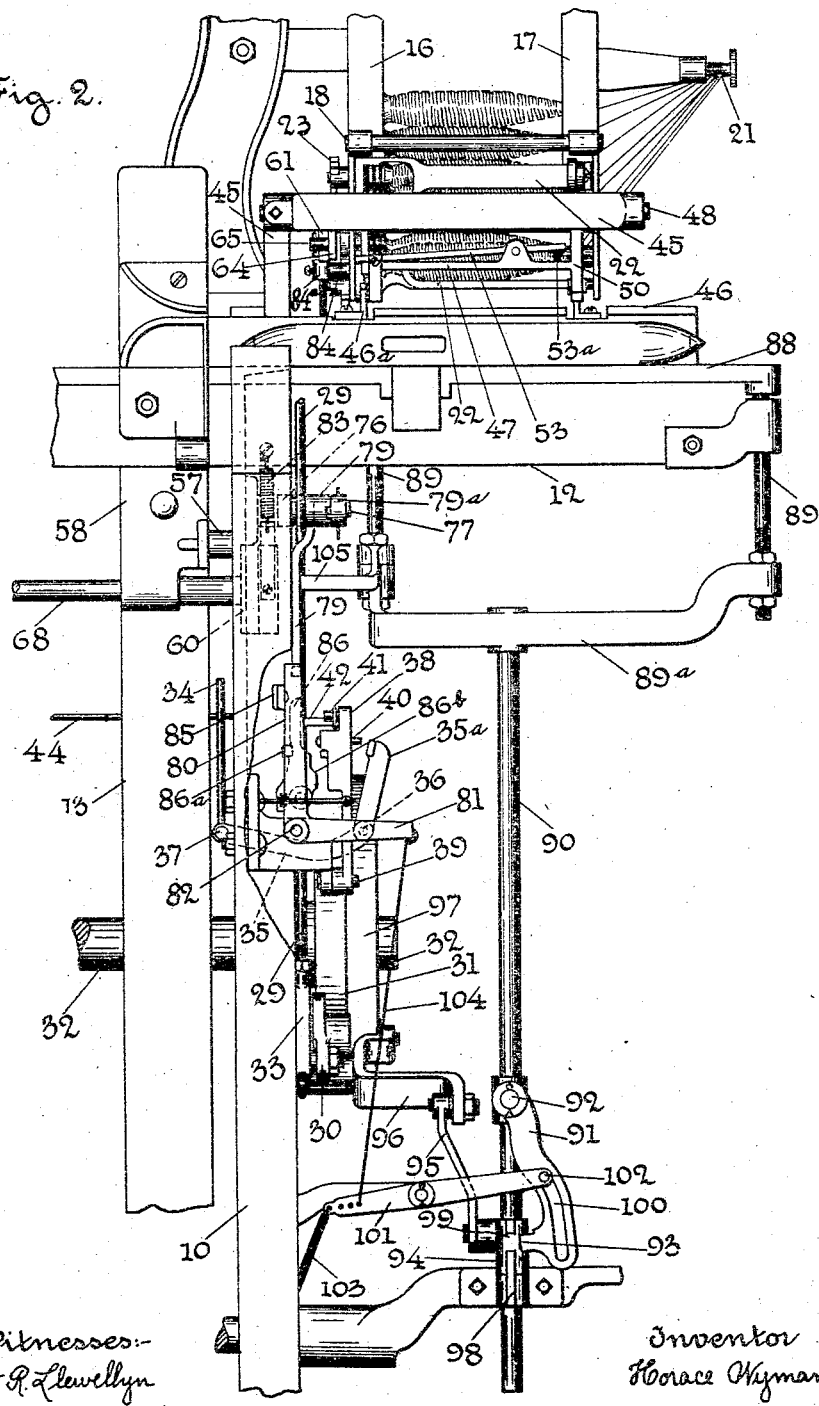

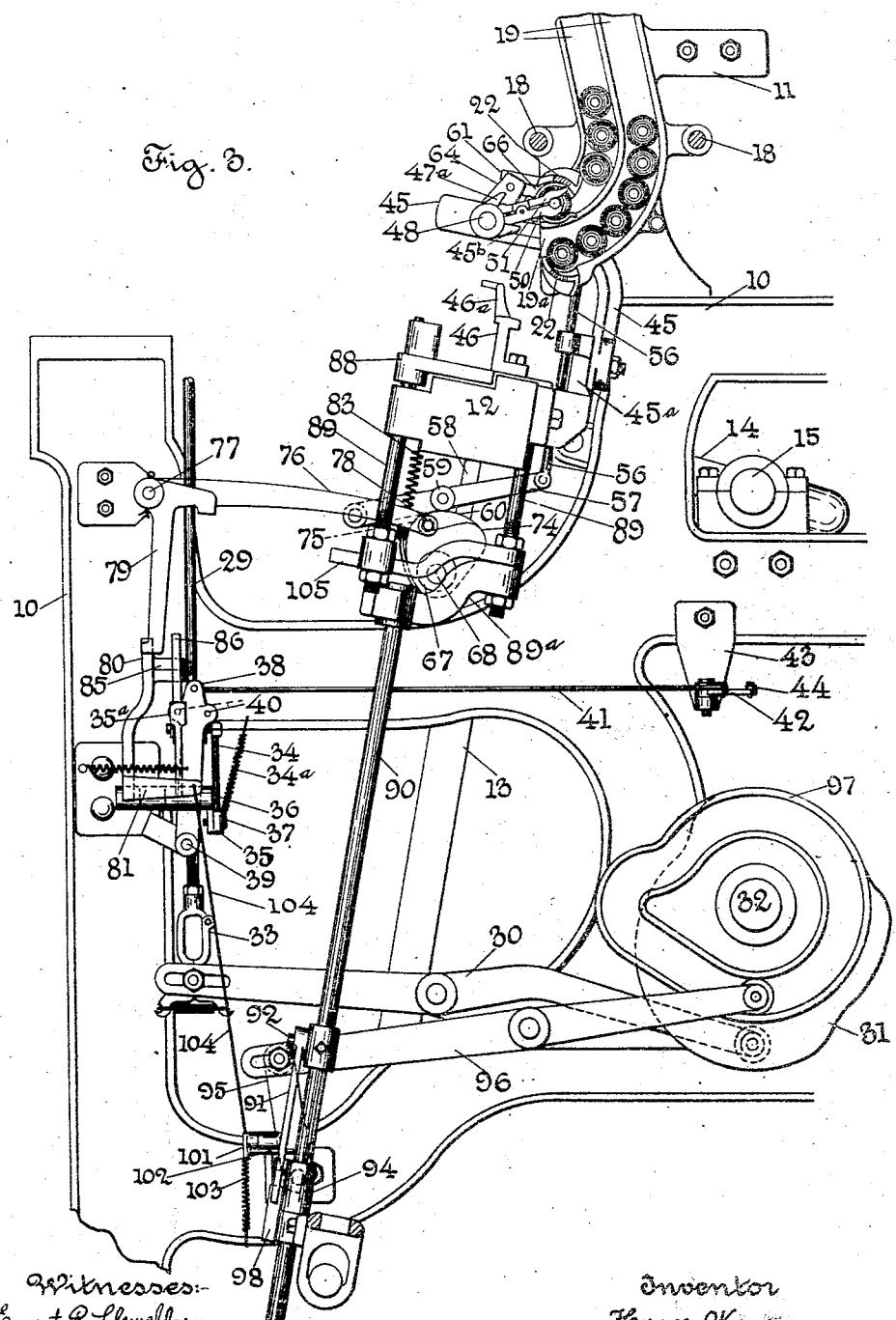

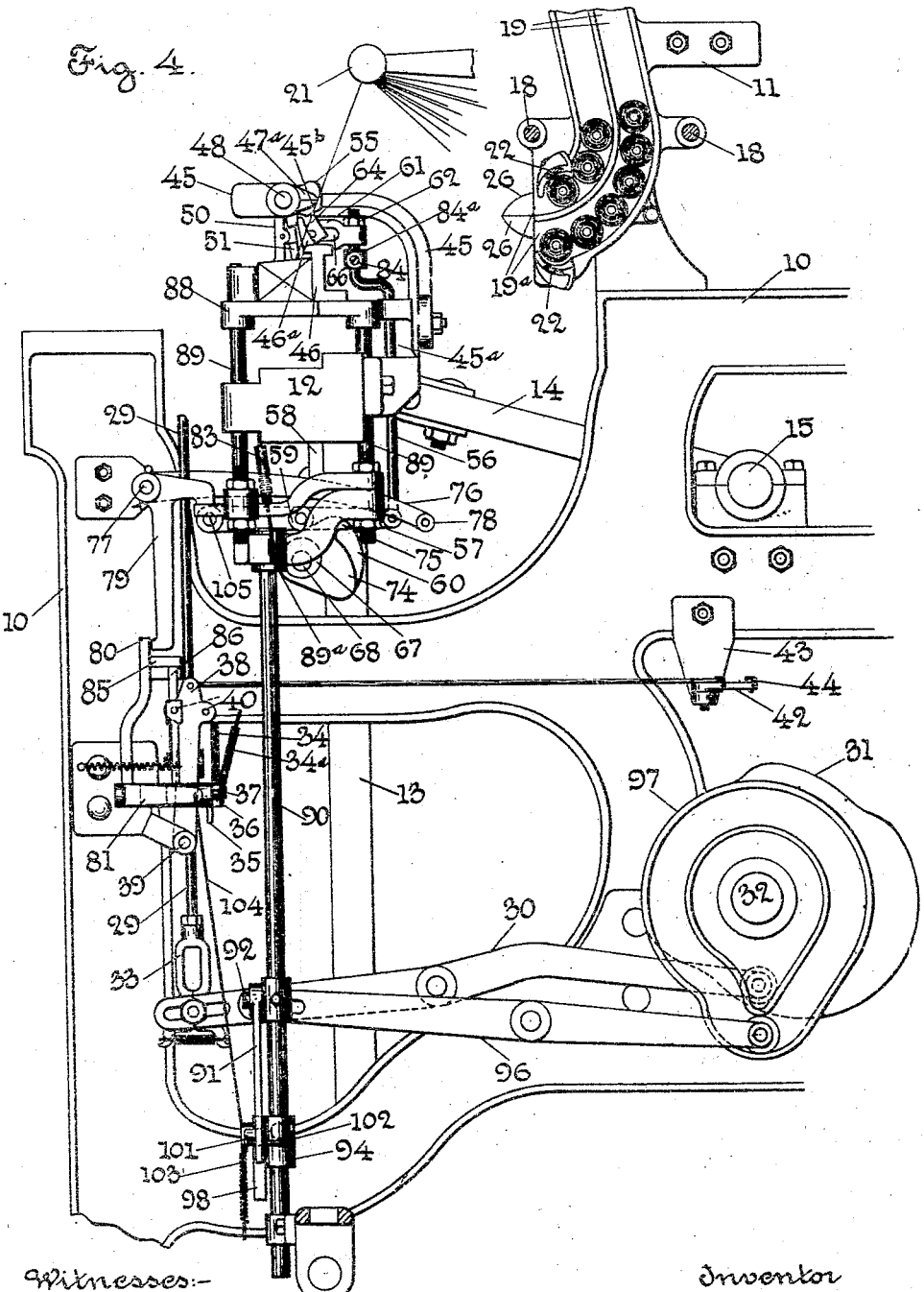

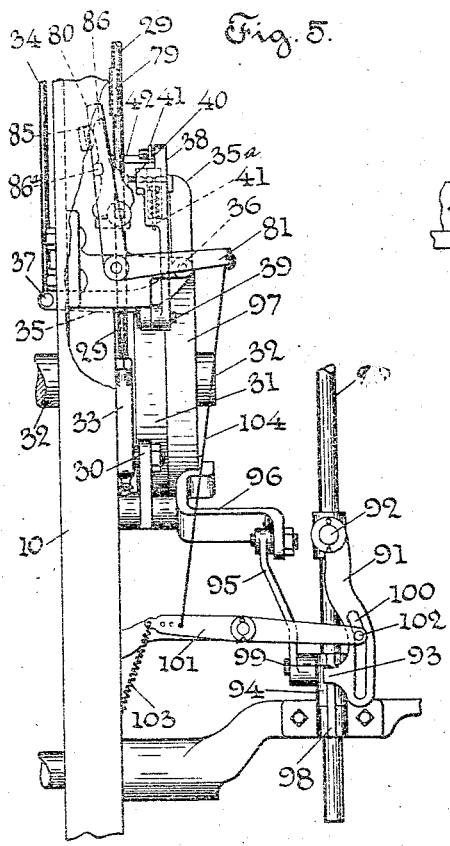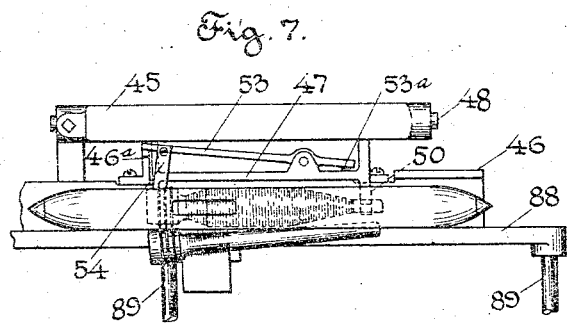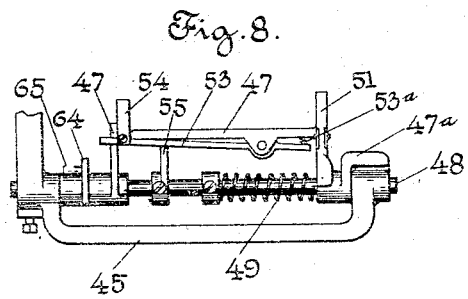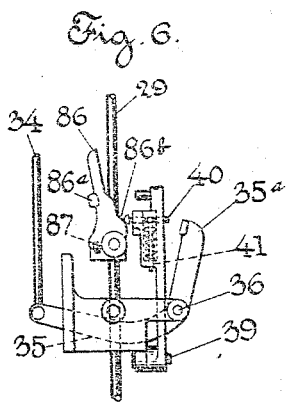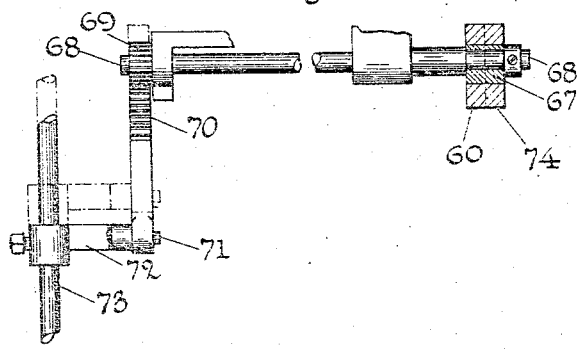

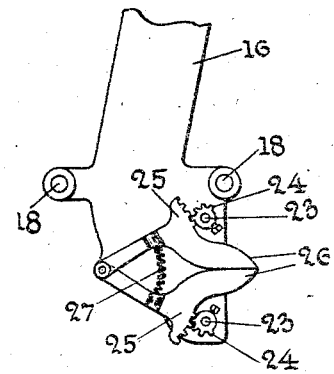
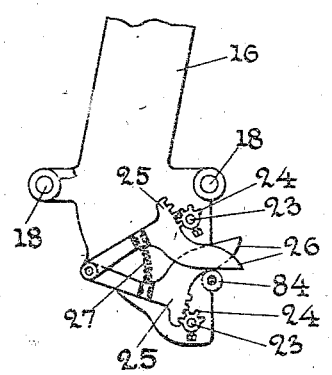
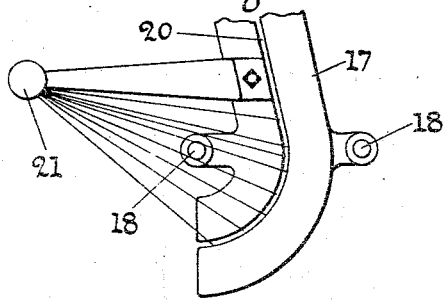
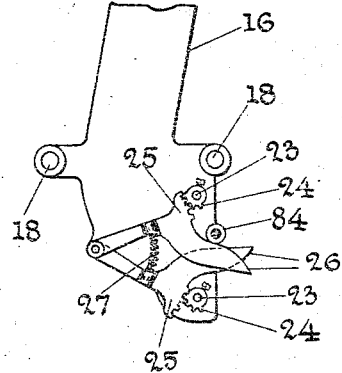

UNITED STATES PATENT OFFICE.

HORACE WYMAN, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

WEFT-REPLENISHING LOOM.

1,142,743.  Specification of Letters Patent.  Patented June 8, 1915.

Application filed February 5, 1914. Serial No. 816,813.

*To all whom it may concern:*

Be it known that I, HORACE WYMAN, a citizen of the United States, residing at Worcester, in the county of Worcester and State of Massachusetts, have invented a new and useful Weft-Replenishing Loom, of which the following is a specification.

This invention relates to a weft replenishing loom of the type in which a magazine mounted on a fixed part of the loom supports a plurality of filled weft carriers or bobbins in position to be automatically transferred to the shuttle to replace a completely or substantially exhausted weft carrier, the operation of the transferring mechanism being controlled by a suitable weft detecting device.

More specifically, my invention in its principal features relates to that class of weft replenishing looms in which the magazine contains two or more compartments having weft carriers with weft of different characteristics therein and also having a drop box or shuttle shifting mechanism for periodically changing the active shuttle.

Drop box or multi-color looms have heretofore been provided with magazines and with transferring mechanism but the transfer has commonly taken place at the extreme forward point of the movement of the lay during the momentary dwell of the shuttle at the forward dead center. In high speed looms, this dwell is extremely brief and the necessary speed of operation of the transferring mechanism frequently results in breakage of parts and damage to the weft carriers.

A transferring device is shown in United States Letters-Patent to Ballou, No. 1,082,390, granted December 23, 1913, in which the transferring mechanism is mounted upon the lay and moves therewith, being so arranged and operated that a large portion of the revolution of the crank shaft is available for the transfer of the bobbin. This device constitutes a marked improvement in single color work but is not applicable to a drop box or multi-color loom, as there is no provision for the selective determination of the bobbin corresponding to the active shuttle.

It is the general object of my present invention to provide an improved construction of weft replenishing mechanism in which the advantages of the prolonged transfer period are realized, while at the same time the device is rendered applicable to multi-color operation. Accordingly, I have combined a transfer mechanism mounted to move with the lay with selective and controlling devices by which the transfer mechanism is caused to select a bobbin or weft carrier corresponding in type to the active shuttle and to thereafter transfer the selected bobbin to the shuttle.

In accordance with the objects thus outlined, the present invention in the preferred form shown in the drawings contemplates the provision, in a weft replenishing loom, of selective and controlling devices comprising a weft detector mounted on the frame of the loom, a gripping device or transferrer mounted to move with the lay, an indicator jointly controlled by the weft detector and the box shifting mechanism to indicate the complete or substantial exhaustion of filling in a particular shuttle, and operative connections by which the gripping device or transferrer is thereafter actuated to select a bobbin corresponding in type to the active shuttle and to insert it in said shuttle. As the active shuttle may be changed between the indication of the weft exhaustion and the actual transfer of the bobbin or weft carrier, I also provide for the suspension of the transfer in such an event until the indicated shuttle again becomes the active shuttle. At the same time the detecting and transferring mechanism is fully available for use in the event of the exhaustion of the weft in any other active shuttle.

For the accomplishment of the objects above referred to, the invention comprises the several features and combinations of parts which will be hereinafter described and more particularly pointed out in the appended claims.

A preferred form of the invention is shown in the drawings in which—

Figure 1 is a side elevation of a portion of a loom embodying my invention, the parts being shown in the position which they occupy during the normal operation of the loom. Fig. 2 is a partial front elevation of a loom showing the parts in the same position as in Fig. 1; Fig. 3 is a side elevation similar to Fig. 1 but showing the parts after the exhaustion of filling has been indicated, with the gripping device in the act of seizing a bobbin in the magazine; Fig. 4 is a side elevation similar to Fig. 1, showing the parts in position to insert a fresh bobbin in the shuttle; Fig. 5 is a front elevation showing certain of the parts in a position corresponding to Fig. 3; Fig. 6 is a detail view showing the provision for resetting the indicator; Fig. 7 is a detail view of the gripping device or transferrer in the act of inserting a bobbin in the shuttle; Fig. 8 is a plan view of the gripping device in position to seize a bobbin in the magazine; Fig. 9 is a detail view of the mechanism for shifting the eccentric supporting the cam which actuates the gripping device; Fig. 10 is a detail view showing the cradle operating devices in normal position; Figs. 11 and 12 show the delivery positions of the cradle operating devices for the lower and upper compartments respectively, and Fig. 13 is a partial detail view of the magazine.

I have shown the invention herein as embodied in a drop box or multi-color loom of ordinary type having a magazine with a plurality of compartments for weft carriers or bobbins of different characteristics at one side of the loom, and shifting shuttle box mechanism at the other side, the magazine being mounted at the rear of the lay and a weft detector being provided upon the magazine end of the loom.

The usual loom frame is indicated at 10 (Fig. 1) on which is mounted a magazine 11.

The lay is indicated at 12 supported upon the usual sword 13 and operated by crank arms 14 from a crank shaft 15.

The magazine 11 is of special form and comprises a pair of end frames 16 and 17 (Fig. 2) maintained in spaced relation by connecting rods 18. Each of the end frames is provided with a pair of parallel substantially-vertical recesses 19 (Fig. 1) which at their lower ends merge into substantially concentric forwardly-opening curved discharge portions 19ª. The recesses in the end frame 16 are adapted to receive the butts of the weft carriers while the recesses in the end frame 17 are similarly adapted to receive the tips thereof.

Between the recesses or guiding portions 19 and 19ª in the frame 17, a slot 20 (Fig. 13) is provided in the frame 17, the slot being parallel to the vertical portions 19 of the recesses and concentric with the lower curved portions 19ª. The ends of the weft threads are brought out from the weft carriers in the magazine through the slot 20 and are secured on a support 21 (Fig. 2) which is substantially over the center of movement of the lay. With this construction the weft threads are held under substantially uniform tension as they advance through the curved portions of the magazine to the position from which they are transferred to the shuttle and are subjected to no unusual strain during the transfer.

A rocking gate or cradle 22 is pivotally mounted near the lower end of each compartment and is shown in its normal position in Fig. 1, in which position it retains the bobbins within the compartment. Each cradle is pivotally supported in the frames 16 and 17. At one end of the cradle a stud 23 (Figs. 10 to 12) extends through the frame 16 and is provided upon the outer side thereof with a segment pinion 24. The pinions 24 are in mesh with segment gears 25 which are each provided with operating arms or extensions 26. A spring 27 normally separates the gears 25 and maintains the cradles in the position shown in Fig. 1.

When the transfer of a bobbin is about to take place an operating device, to be hereinafter described, is brought into operative relation with one or the other of the arms 26, turning the same to move the cradle as indicated in the upper compartment of Fig. 3. Reference to this figure will show that the cradle in this position releases the lowermost bobbin while at the same time it prevents the escape of the next higher bobbin. Furthermore, the cradle acts to rigidly support the released bobbin against the thrust of the bobbin gripping or transferring mechanism.

A weft detector of one of the usual forms is essential for the operation of my device and I have herein indicated at 28 (Fig. 1) a feeler of the type fully described in Letters-Patent No. 972,722 issued to E. H. Ryon, October 11, 1910. This type of feeler is designed to operate upon the substantial exhaustion of the weft upon the bobbin, causing the insertion of a fresh bobbin before the weft is entirely run off. It should be understood, however, that the utility of my invention is not dependent upon the use of any particular type of weft detector and that many of its advantages may be secured in connection with a weft fork or similar device which does not become operative until the weft is completely exhausted.

As fully described in the patent above referred to, the weft detector herein shown comprises a vertically movable operating rod 29 which is periodically lifted by a lever 30 controlled by a feeler cam 31 mounted upon the usual cam shaft 32. An emergency release connection 33 of common form connects the lever 30 to the rod 29. For the understanding of the present invention, it is sufficient to state that under normal conditions the rod 29 moves idly but that, as soon as the feeler indicates the substantial exhaustion of the weft in the shuttle, the rod 29 becomes operative upon the rod 34 (Fig. 2) and forces the same downward into the position shown in Fig. 5. For a full description of the devices by which this result is obtained, reference is made to the patent cited. A curved lever 35 (Figs. 2 and 5) is pivotally mounted at 36 upon a bracket secured to the loom side and is pivotally connected at 37 to the rod 34. A spring 34<sup>a</sup> (Figs. 1, 3 and 4) normally retains the rod 34 and lever 35 in the position shown in Figs. 2 and 6. The downward movement of the rod 34 swings the upwardly projecting portion 35<sup>a</sup> of the lever 35 to the left as viewed in Figs. 2 and 5.

Referring now to the indicating mechanism which enables the feeler to indicate the exhaustion of filling in a particular shuttle, an indicating arm 38 (Figs. 1 and 2) is mounted upon a stud 39 secured to the loom side and is connected to swing transversely in front of the arm 35<sup>a</sup> of the lever 35. The arm 38 has mounted therein a plurality of indicating pins 40 (Figs. 5 and 6), each of which is adapted to be yieldingly retained in either one of two longitudinal positions by a spring pressed plunger 41. When the lever 35 is swung to the position shown in Fig. 5 by the depression of the rod 34 it operates to force one or the other of the pins 40 into the position shown in Fig. 5 in which the pin projects on the left hand side of the arm 38.

The upper end of the arm 38 is connected through a link 41 to a bell crank 42 mounted upon a bracket 43 secured to the loom side and in turn connected by a link 44 to any convenient part of the shuttle box operating mechanism at the opposite side of the loom so that it may receive a longitudinal motion dependent upon the indications of the pattern surface or the movement of the shuttle boxes. Through these connections the arm 38 is moved to the right or the left as viewed in Fig. 1 in accordance with the raising or lowering of the drop shuttle boxes at the opposite end of the loom. This movement of the arm 38 brings one of the pins 40 in line with the lever 35.

The displacement of a pin 40 to the left by the lever 35 initiates a series of operations which result in the removal of a fresh bobbin from the magazine and the placing of the same in the active shuttle. The mechanism through which these results are obtained comprises in general a transferrer or gripping device mounted upon the lay, a cam also mounted upon the lay for operating the gripping device, and connections whereby the actuation of the cam is controlled through the indication of a pin 40.

The gripping device or transferrer is mounted upon a curved bracket 45 (Fig. 1) secured to a casting 45<sup>a</sup> fastened to the back of the lay on the magazine end of the loom. The gripping device comprises a rigid frame 47 (Figs. 7 and 8) pivotally mounted upon a shaft 48 secured in the bracket 45, said frame being normally maintained in the position shown in Fig. 1 by the torsion spring 49, which swings the frame downward until a projection 47<sup>a</sup> on the frame contacts with a stop lug 45<sup>b</sup> on the bracket 45.

One end of the rigid frame 47 is extended at 50 (Fig. 1) to form one of a pair of gripping fingers for grasping the tip of the bobbin. The other finger 51 is pivotally mounted upon the frame 47 and is pressed toward the finger 50 by a spring 52. A lever 53 (Figs. 7 and 8) is pivoted to the frame 47 and has depending therefrom at one end a pair of spring fingers 54 which are adapted to grasp the butt of a bobbin when in their normal position shown in Fig. 1. The lever 53 is yieldingly held in this position by a spring 53<sup>a</sup> and may be moved upward relatively to the frame 47 by contact with a projection 46<sup>a</sup> upon the back binder 46 as shown in Fig. 7 to release the butt of a bobbin grasped thereby. When the gripping device is turned to the position shown in Fig. 3 to seize a fresh bobbin in the magazine, the lever 53 comes in line with a rigid arm 55 secured upon the shaft 48 which prevents movement of the lever 53 relative to the frame 47, and enables the spring fingers 54 to be forced over the butt of a bobbin.

The normal position of the gripping device is that shown in Fig. 1 and suitable operating devices are necessarily provided for moving the gripping device to the position shown in Fig. 3. These devices include a vertically movable rod 56 (Fig. 1) which is connected at its lower end to an arm 57 pivoted on a bracket 58 secured to the lay sword 13. The arm 57 has mounted thereon a roll 59 which coöperates with a cam 60, the operation of which will be hereinafter described. At the upper end, the rod 56 is screwed into a slotted arm 61 and is firmly held in place by a check nut 62. An arm 64 (Figs. 1 and 8) is secured to or formed integral with the rigid frame member 47 and has projecting laterally therefrom a stud 65. This stud extends into the slot 66 in the arm 61 and forms a sliding connection between the rod 56 and the gripping device.

It will be obvious that upward movement of the rod 56 will turn the gripping device upon the shaft 48 and that the extent of angular movement of the gripping device will depend upon the vertical movement of the rod 56. By varying the limits of this vertical movement the gripping device may be swung into a position to seize a bobbin in either the upper or the lower magazine compartment.

The devices for selectively controlling and operating the cam 60 will now be described. The cam is mounted for partial rotation upon an eccentric bushing 67 (Figs. 1 and 9) which is secured to a shaft 68 pivotally mounted in bearings upon the lay sword 13 and which extends across the loom. At its opposite end, the shaft 68 is provided with a pinion 69 (Fig. 9) meshing with a vertically movable rack 70. This rack may be operated in any convenient manner from the drop shuttle mechanism and is herein shown as supported upon a stud 71 mounted in a bracket 72 secured to the box lifting rod 73. With these connections it will appear that vertical movement of the drop boxes will result in partial rotation of the shaft 68 and the eccentric 67, the rotation of the eccentric raising or lowering the effective center of rotation of the cam 60. Secured to or integral with the cam 60 is an operating disk 74 (Figs. 1-3 and 4) having a hook-shaped projection 75 formed thereon. An arm 76 is pivotally supported on a stud 77 secured to the loom side and has mounted thereon a roll 78. Under normal operating conditions the arm 76 is supported in raised position by a latch 79 also mounted upon the stud 77. The hub of the latch has a notch in the end which coöperates with a projection on the end of a collar 79ª fixed to the stud 77, (Fig. 2) thus limiting the movement of the latch 79 and the arm 76. The lower end of the latch 79 normally contacts with the side of an upwardly projecting arm 80 forming one part of a bell crank 81 pivotally mounted upon the loom side at 82. Under certain conditions, which will be hereinafter described, the arm 80 is moved to the left as seen in Fig. 5, thereby releasing the latch 79 and allowing the arm 76 to descend bringing the roll 78 in the path of the operating disk 74. As the lay moves back, the disk and the cam 60 secured thereto are then moved from the position shown in Fig. 1 to that shown in Fig. 3. This movement of the cam forces the lever 57 into the position shown in Fig. 3, which in turn moves the rod 56 vertically to swing the gripping device upon its supporting member.

When the eccentric 67 is in the position shown in Figs. 1 and 3, the movement of the rod 56 will carry the gripping device to its extreme upper position, in which it coöperates with the upper compartment of the magazine. Should the drop boxes be shifted the eccentric 67 will be turned to a position diametrically opposite to the position shown in Figs. 1 and 3 and the gripping device will then coöperate with the lower compartment of the magazine. A spring 83 secured to the lay is flexibly connected with the cam 60 and acts to return the cam together with the operating parts and the gripping device to the position shown in Fig. 1 when the cam is released from the arm 76. The exact positioning of the gripping device is accomplished by the coöperation of the lugs 45ᵇ and 47ª. A cam roll 84 is mounted upon a collar 84ª on the rod 56.

When the rod is raised to turn the gripping device to operative position, the roll 84 contacts with one or the other of the arms 26 (Figs. 10 to 12) to move one of the segment gears 25 to rotate the corresponding cradle 22. Fig. 10 shows the parts in normal position. Fig. 11 shows the roll 84 operating the lower cradle and Fig. 12 shows the roll 84 operating the upper cradle. The upward limit of the vertical movement of the rod 56 as determined by the position of the eccentric 67 will selectively control the operation of the upper or the lower cradle by the roll 84.

The following selective and controlling devices are provided which govern the movement of the bell crank 81 and the release of the latch 79: The upwardly projecting arm 80 of the bell crank 81 has a lug 85 upon its rear side and a vertically movable cam plate 86 (Fig. 6) pivotally mounted upon the vertically movable rod 29 (previously described) is constantly reciprocated adjacent to said lug. Upon its right side (as viewed in Fig. 6) the plate 86 is provided with a plurality of cam projections, the plate being normally moved toward vertical position by a weak spring 87 and being held from movement beyond vertical position toward the right by a lug 86ˣ which projects from the side of the plate 86 and contacts with the rod 29. The cam plate 86 remains inoperative until one of the indicating pins 40 is moved by the device previously described to the position shown in Fig. 5, this movement of the pin being controlled by the weft detector. The arm 38 is so positioned that the pin 40 corresponding to the active shuttle is always in line with the cam plate 86. Upon the next upward movement of the rod 29 the cam projections upon the plate 86 will contact with the pin 40 and the cam will be swung to the left as shown in Fig. 5. By this movement the cam plate is forced against the lug 85, thus swinging the arm 80 to the left and releasing the latch 79. The release of the latch takes place after the exhausted shuttle has been returned to the drop box side of the loom and it may frequently happen that a drop box mechanism will operate to change the active shuttle before the exhausted shuttle is returned to the magazine end of the loom. In this event the connections previously described between the drop box mechanism and the indicating arm 38 act to suspend the release of the latch and the transfer of the bobbin, as follows: The parts are so timed that the drop box mechanism will operate before the rod 29 is given its upward movement. In case the boxes are changed, the arm 38 will be moved to a different position thus bringing the indicated pin 40 out of line with the cam plate 86. The cam plate will then continue inoperative until the exhausted shuttle again becomes active, when the indicated pin will be returned to its first position. While this pin is in inoperative position, however, it will be evident that should the filling become exhausted in the then active shuttle the other pin 40 may be indicated and the proper bobbin selected and transferred regardless of the previous indication.

Suitable mechanism is necessarily provided through which the actual transfer of the fresh bobbin to the shuttle may be performed. The shuttle box upon the magazine end of the loom, indicated diagrammatically at 88, is mounted for vertical movement upon rods 89 which are vertically adjustable in a casting $89^a$ secured to a vertically movable lifter rod 90 (Fig. 2). A depending arm 91 (Figs. 2 and 5) is pivotally mounted at 92 upon a collar secured to the rod 90 and has near its lower end a projecting lug 93. A second collar 94 is mounted to slide freely upon the rod 90 and is connected by a link 95 to a lever 96 which is periodically operated by a cam 97 (Fig. 1). The collar 94 has a rib 98 projecting from its front side, which rib is provided with a notch 99 adapted at times to receive the lug 93. The depending arm 91 has formed therein a cam slot 100 and a lever 101 pivotally mounted upon the loom side carries at one end a long stud 102 which extends into the slot 100 in all positions of the lay. The lever 101 is normally maintained in the position shown in Fig. 2 by a spring 103 secured to the loom side. A link 104 is adjustably secured at its lower end to the lever 101 and at its upper end is connected to the bell crank 81. When the bell crank and lever are in their normal positions, the stud 102 is near the upper end of the slot 100 and maintains the depending arm 91 in such a position that the lug 93 is clear of the notch 99. Under these conditions the vertical reciprocation of the collar 94 is ineffective to produce movement of the lifter rod 90. When, however, the bell crank 81 is moved by the cam plate 86 to initiate the transfer of a fresh bobbin, the lever 101 is simultaneously moved to the position shown in Fig. 5, permitting the lug 93 to enter the notch 99, thereby connecting the rod 90 with the sliding collar 94. On its next vertical movement, the collar 94 will move the rod 90 upward, thereby lifting the shuttle box 88 to the position shown in Fig. 4, causing the fresh bobbin to be inserted in the shuttle. As the shuttle box rises, an upwardly projecting finger $46^a$ (Fig. 7) mounted on the back box plate 46 raises the lever 53 and the spring fingers 54 relative to the rigid frame 47, thus releasing the bobbin from the fingers 54. The empty bobbin is forced downward through the bottom of the shuttle, as shown in Fig. 7, and an opening is provided in the bottom of the shuttle box 88 to permit the empty bobbin to pass therethrough.

An arm 105 (Figs. 2 and 3) is rigidly secured to one of the rods 89 and, when moved upwardly with the shuttle box, it contacts with the latch 79, returning the latch and the arm 76 to their normal raised position. While held in this position the bell crank 81 is moved to the right by the spring 103 so that the upwardly projecting arm 80 again becomes operative to maintain the latch 79 in the position shown in Fig. 1. The resetting of the indicating pin 40, after it has performed its function by causing the release of the latch 79, is accomplished by an additional cam projection $86^b$ (Fig. 6) upon the right side of the cam plate 86. As the plate continues its upward movement after releasing the latch 79, this lower projection contacts with the pin 40 and forces it back to normal position against the yielding resistance of the plunger 41. The resistance of the plunger is sufficient to move the cam plate to the left to the position shown in Fig. 5, thus releasing the latch 79 as the plate rises but further movement to the left is prevented by the opposed lugs which support the spring 87.

Although the operation of the different elements of my invention has been described in detail, a brief statement of the general operation of the device as a whole may be found desirable. With the parts in normal position, partial or complete exhaustion of filling in the active shuttle will be effective through the feeler mechanism to cause downward movement of the rod 34, swinging the upwardly projecting portion $35^a$ of the lever 35 to the left and forcing one of the indicating pins 40 into operative position. This occurs upon the extreme forward movement of the lay with the shuttle in the magazine end of the loom. The shuttle is then thrown to the drop box side of the loom and the cam plate 86 begins to rise. If there has been no change in the active shuttle, the indicated pin 40 forces the cam plate to the left, carrying with it the arm 80 and releasing the latch 79. The arm 76 with its roll 78 is thus lowered into the path of the hook-shaped projection 75 upon the disk 74. This takes place during the forward movement of the lay while the shuttle is still at the drop box end of the loom. As the lay again moves back, the cam roll 78 turns the cam 74 upon its eccentric bearing, raising the lever 57 and the rod 56, and turning the gripping device into an operative position opposite one or the other of the magazine compartments. The position of the gripping device relative to the compartments is selectively determined by the position of the eccentric 67, which in turn is controlled from the drop box mechanism. This movement of the gripping device having taken place during the first part of the rearward movement of the lay, the cam roll 84 thereafter operates to partially rotate one of the cradles 22. The gripping device is then in position to force its spring fingers over the tip and the butt of a bobbin in the magazine, the cradle meanwhile supporting the bobbin against the rearward thrust of the gripping device. While the bobbin is being seized by the gripping device, the shuttle is again thrown to the magazine end of the loom. During the ensuing reciprocation of the lay and before it again returns to rearmost position, the shuttle box 88 is raised and the fresh bobbin is inserted in the shuttle. As the latch 79 and the indicated pin 40 have been reset as previously described, all of the parts are again in normal position and the loom continues its operation in the usual manner. The suspension of the transfer, in the event of a change in the active shuttle between the indication and the actual transfer, has been fully described.

Where the word "bobbin" occurs in this description or in the claims it is to be understood broadly as covering any of the ordinary types of weft carrier and where reference is made to the exhaustion of the weft, the reference includes both the partial exhaustion determined by a detector of the "feeler" type and the complete exhaustion indicated by the ordinary weft fork, unless otherwise defined.

While I have shown and described a two-shuttle loom, certain features of my invention are equally applicable to looms having more than two shuttles, and certain other features are also of value in a single shuttle loom. I am also aware that many modifications and changes can be made in my invention without departing from the spirit and scope thereof, as set forth in the claims annexed, and I do not wish to be limited to the details of construction herein disclosed, but What I do claim is:—

1. A weft replenishing loom having, in combination, a frame, a bobbin magazine mounted on said frame, a lay, a normally empty gripping device mounted on said lay, a weft detector effective to indicate the condition of the weft in the active shuttle and means controlled by said detector for first moving said gripping device into position to remove a bobbin from the magazine and for causing said bobbin to be inserted in the shuttle immediately thereafter.

2. A weft replenishing loom having, in combination, a lay, a gripping device bodily movable with said lay, a magazine mounted on the loom at the rear of the lay, and means to actuate said gripping device to seize a bobbin in said magazine on the rearward movement of the lay and to remove the same from the magazine as the lay moves forward.

3. A weft replenishing loom having, in combination, a frame, a lay, a bobbin magazine mounted on said frame at the rear of the lay, gripping devices mounted on said lay, a weft detector, and means controlled by the weft detector to actuate the gripping devices to seize a bobbin in the magazine on the backward stroke of the lay and to insert said bobbin in the shuttle before the lay again returns to its rearward position.

4. A weft replenishing loom having, in combination, a frame, a bobbin magazine mounted on said frame, a lay, a normally empty gripping device mounted on said lay, a weft detector effective to detect the partial or complete exhaustion of the weft in the shuttle, and mechanism controlled by said weft detector to thereafter actuate said gripping device to remove a bobbin from the magazine and to cause said bobbin to be immediately thereafter inserted in the shuttle.

5. A weft replenishing loom having, in combination, a frame, a bobbin magazine mounted on said frame, a lay, a normally empty gripping device mounted on said lay, a weft detector effective to detect the partial or complete exhaustion of the weft while the shuttle is in the magazine end of the loom, mechanism controlled by the weft detector to start the actuation of the gripping device to remove a bobbin from the magazine while the shuttle is at the opposite end of the loom and to cause said bobbin to be inserted in the shuttle when the shuttle returns to the magazine end of the loom.

6. A weft replenishing loom having, in combination, a frame, a magazine mounted on said frame and comprising a bobbin guiding compartment and a cradle pivoted at the mouth of said compartment a gripping device normally in inoperative position with reference to the magazine, and means to move said device to operative position and to partially rotate said cradle to release the lowest bobbin, said cradle when rotated retaining the next higher bobbin in the compartment and supporting the released bobbin against the thrust of the gripping device.

7. A weft replenishing loom having, in combination, a frame, a bobbin magazine mounted on said frame, a lay, a gripping device mounted on said lay and normally inoperative relative to said magazine, a weft detector, and means controlled by said detector to move said gripping device to operative position relative to said magazine, a portion of said gripping device being yieldingly supported when in inoperative position relative to said magazine, and rigidly supported when in operative position.

8. A weft replenishing loom having, in combination, a frame, a bobbin magazine mounted on said frame, a lay, a shaft on said lay, and a gripping device pivotally mounted on said shaft, an element of said gripping device being mounted to yield when in inoperative position relative to said magazine and being rigidly supported by an arm on said shaft when in operative position.

9. In a weft replenishing loom, the combination of a lay and a bobbin gripping device mounted on said lay, said device comprising a shaft, a rigid frame pivotally mounted on said shaft, and fingers rigidly supported relative to said frame in one position and yieldingly supported relative to said frame when in another position.

10. In a weft replenishing loom, the combination of a lay and a bobbin gripping device mounted on said lay, said device comprising a shaft, a rigid frame pivotally mounted on said shaft and movable to bobbin-receiving and bobbin-delivering positions, and gripping fingers movable relative to said frame, said shaft having a lug thereon effective to prevent relative movement of the fingers and frame when the frame is in bobbin-receiving position.

11. A weft replenishing loom having in combination, a lay and a bobbin gripping device mounted on said lay, said device comprising a shaft, a rigid frame pivotally mounted on said shaft, fingers secured to said frame to support the tip of a bobbin, additional fingers for the butt of the bobbin pivotally mounted on the frame, and means to raise said pivoted fingers above the frame thereby releasing the bobbins therefrom.

12. In a weft replenishing loom, the combination of a lay, a bobbin gripping device mounted on said lay, fingers on said device adapted to yieldingly hold a bobbin therein, and a vertically movable shuttle box, said box having a projection which when raised, acts to force said fingers upward to inoperative position relative to a bobbin held thereby.

13. A weft replenishing loom having, in combination, a fixed bobbin magazine, a lay, a bobbin gripping device mounted on the lay, a vertically movable shuttle box, a rod supporting said box, a latch on said rod, a collar mounted to slide on said rod, means to slide said collar on said rod, a weft detector, and means controlled by said detector for moving the latch to connect said collar to said rod.

14. A weft replenishing loom having, in combination, a shuttle, a lay, a bobbin magazine at the rear of the lay, a pivoted member having gripping fingers bodily movable with the lay, means to move said member to seize a bobbin in the magazine on its rearward movement and means to cause relative vertical movement of said member and said shuttle, whereby the bobbin is inserted into the shuttle before the lay again returns to its rearmost position.

15. A weft replenishing loom having, in combination, a magazine having a plurality of compartments therein, a plurality of shifting shuttle boxes, mechanism for shifting said boxes, a gripping device mounted on the lay and effective to remove a bobbin from a compartment and place it in a shuttle, and connections controlled by the box shifting mechanism for determining the compartment from which the gripping device shall remove a bobbin.

16. A weft replenishing loom having, in combination, a magazine having a plurality of compartments and discharge openings therefor, a lay, a gripping device movably mounted on said lay, a plurality of shifting shuttle boxes, mechanism to shift said boxes, a weft detector and means controlled jointly by said detector and said mechanism to move said gripping device to a position opposite a bobbin in the magazine corresponding to the then active shuttle, when the weft therein is exhausted.

17. A weft replenishing loom having, in combination, a magazine having a plurality of compartments and discharge openings therefor, a lay, a gripping device movably mounted on said lay, a plurality of shifting shuttle boxes, mechanism to shift said boxes, means to actuate the gripping device to remove a bobbin from the magazine, and selective means controlled by the box shifting mechanism to determine the compartment from which said bobbin shall be removed.

18. A weft replenishing loom having, in combination, a magazine having a plurality of compartments and discharge openings therefor, a lay, a gripping device movably mounted on said lay, a plurality of shifting shuttle boxes, mechanism to shift said boxes, a cam to actuate the gripping device to remove the bobbin from the magazine, an eccentric supporting said cam, and connections from the box shifting mechanism for setting said eccentric to correspond with the position of the boxes.

19. A weft replenishing loom having, in combination, a lay, a bobbin magazine having a plurality of compartments therein, a bobbin gripping device mounted on the lay, a weft detector, a cam on said lay for operating said gripping device, an arm mounted on the loom frame effective to actuate said cam, a latch controlling said arm, and mechanism controlled by the weft detector for moving said latch, thereby releasing said arm to actuate said cam.

20. A weft replenishing loom having, in combination, a lay, a bobbin magazine having a plurality of compartments with adjacent discharge openings, a bobbin gripping device mounted on the lay, a weft detector, a plurality of shifting shuttle boxes, mechanism to shift said boxes, means controlled by said mechanism to determine the relation of said gripping device to said compartments, and means controlled by said detector to move said gripping device to operative position.

21. A weft replenishing loom having, in combination, a lay, a bobbin magazine having a plurality of compartments therein, a bobbin gripping device mounted on the lay, a weft detector, a plurality of shifting shuttle boxes, mechanism for shifting said boxes, and an indicator jointly controlled by the weft detector and the shifting mechanism to indicate the exhaustion of filling in the active shuttle, said gripping device being thereafter actuated to select a bobbin corresponding to the one in the active shuttle and to insert it immediately therein, provided the active shuttle is not shifted after the setting of the indicator.

22. A weft replenishing loom having, in combination, a magazine having a plurality of compartments and discharge openings therefor vertically disposed, a lay, a gripping device movably mounted on said lay, a plurality of vertically shifting shuttle boxes, mechanism to shift said boxes, and connections to cause said gripping device to be moved to one of a plurality of vertical operative positions opposite one of said discharge openings in accordance with the vertical movement of the shuttle boxes.

23. A weft replenishing loom having, in combination, a lay, a magazine mounted on the loom at the rear of the lay and having a plurality of compartments, a gripping device movably mounted on said lay, a plurality of shifting shuttle boxes, mechanism to shift said boxes, and selective means to actuate said gripping device on the rearward movement of the lay to seize a bobbin in that compartment corresponding to the then active shuttle and to remove the same from the compartment as the lay moves forward.

24. A weft replenishing loom having, in combination, a lay, a bobbin magazine having a plurality of compartments therein, a bobbin gripping device mounted on the lay, a weft detector, a plurality of shifting shuttle boxes, mechanism for shifting said boxes, means controlled jointly by said detector and said shifting mechanism, upon an indication of the exhaustion of filling in the active shuttle to thereafter actuate the gripping device to remove a bobbin corresponding to the active shuttle and to insert it in said shuttle, and devices effective to suspend the operation of said means if the shuttles are changed before the transfer takes place.

25. A weft replenishing loom having, in combination, a lay, a bobbin magazine having a plurality of compartments therein, a bobbin gripping device mounted on the lay, a weft detector, a plurality of shifting shuttle boxes, mechanism for shifting said boxes, and means controlled jointly by said detector and said shifting mechanism, upon an indication of the exhaustion of filling in the active shuttle, to thereafter actuate the gripping device to remove a bobbin corresponding to the active shuttle and to insert it in said shuttle, and devices effective to suspend the operation of said means if the shuttles are changed before the transfer takes place and to allow the transfer to take place when the indicated shuttle again becomes active.

26. A weft replenishing loom having in combination, a magazine having a plurality of compartments therein, a plurality of shifting shuttle boxes, mechanism for shifting said boxes, a gripping device mounted on the lay, and effective to remove a bobbin from a compartment and place it in a shuttle, and connections operable in timed relation with said box-shifting mechanism for determining the compartment from which the gripping device shall remove a bobbin.

In testimony whereof I have hereunto set my hand, in the presence of two subscribing witnesses.

HORACE WYMAN.

Witnesses:
ERNEST R. LLEWELLYN,
J. B. SYME.